(12) United States Patent
Kogami (10) Patent No.: US 7,243,970 B2
(45) Date of Patent: Jul. 17, 2007

(54) LID OPERATING DEVICE AND STORAGE DEVICE USING THE SAME

(75) Inventor: Mitsuru Kogami, Utsunomiya (JP)

(73) Assignee: Nifco Inc., Yokohama-shi (JP)

( * ) Notice: Subject to any disclaimer, the term of this patent is extended or adjusted under 35 U.S.C. 154(b) by 254 days.

(21) Appl. No.: 11/070,303

(22) Filed: Mar. 3, 2005

(65) Prior Publication Data

US 2005/0205591 A1 Sep. 22, 2005

(30) Foreign Application Priority Data

Mar. 8, 2004 (JP) .............................. 2004-063321

(51) Int. Cl.
*B60N 3/12* (2006.01)
(52) U.S. Cl. ..................... 296/37.8; 296/37.9
(58) Field of Classification Search ............... 296/37.8, 296/37.9, 37.12, 37.13; 220/830; 312/319.2, 312/327, 328
See application file for complete search history.

(56) References Cited

U.S. PATENT DOCUMENTS 5,520,313 A * 5/1996 Toshihide ................... 224/539
7,025,225 B2 * 4/2006 Inari ......................... 220/830
2004/0020935 A1 2/2004 Inari

FOREIGN PATENT DOCUMENTS

| JP | 2000-272426 | 10/2000 |
|----|-------------|---------|
| JP | 2001-151023 | 6/2001  |

* cited by examiner

*Primary Examiner*—Jason S Morrow
(74) *Attorney, Agent, or Firm*—Manabu Kanesaka

(57) ABSTRACT

A lid operating device for switching a lid between a closed position and an open position relative to a main body includes a first urging device for urging the lid from the closed position to a mid position before reaching the open position, and a second urging device for urging the lid from the open position to the mid position. A striker is disposed on the lid or main body, and a latching device is disposed on the main body or lid for engaging the striker to hold the lid at the closed position. The lid is automatically rotated from the closed position to the mid position by the first urging device, and manually rotated from the mid position to the open position against the urging force of the second urging device.

5 Claims, 7 Drawing Sheets

LID OPERATING DEVICE AND STORAGE DEVICE USING THE SAME

BACKGROUND OF THE INVENTION AND RELATED ART STATEMENT

The present invention relates to a lid operating device for switching a lid position between an open position and a closed position relative to a corresponding surface of a main body (an operation panel), and a storage device using the same.

Figure 1A:
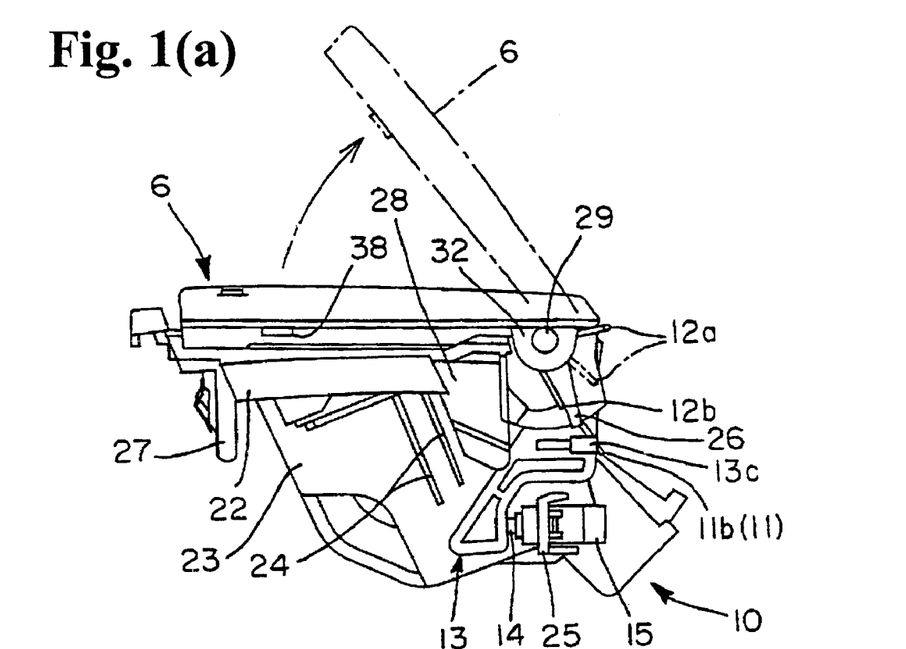
FIG. 1(a) is a side view and FIG. 1(b) is a schematic sectional view taken along line 1(b)-1(b) in FIG. 2(a)
Figure 1B:
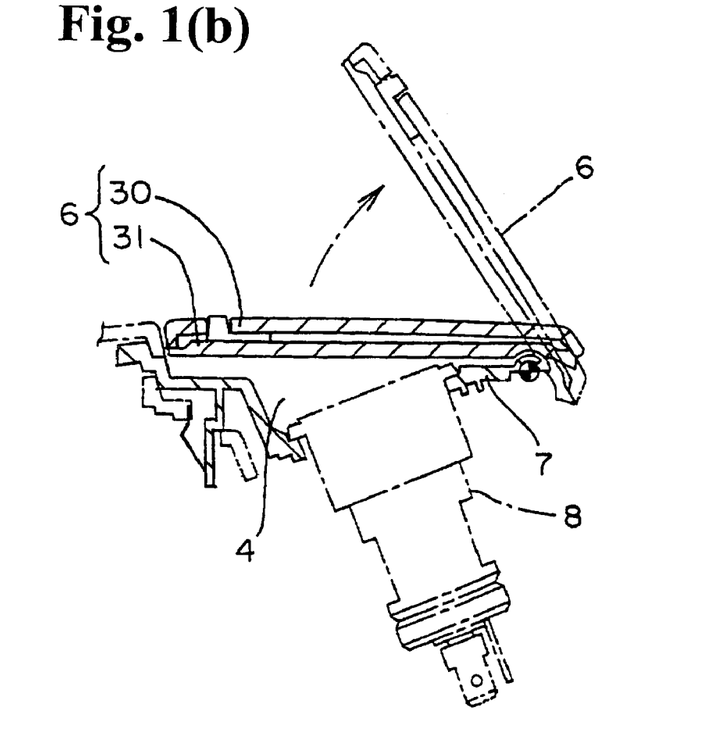
Figure 7:
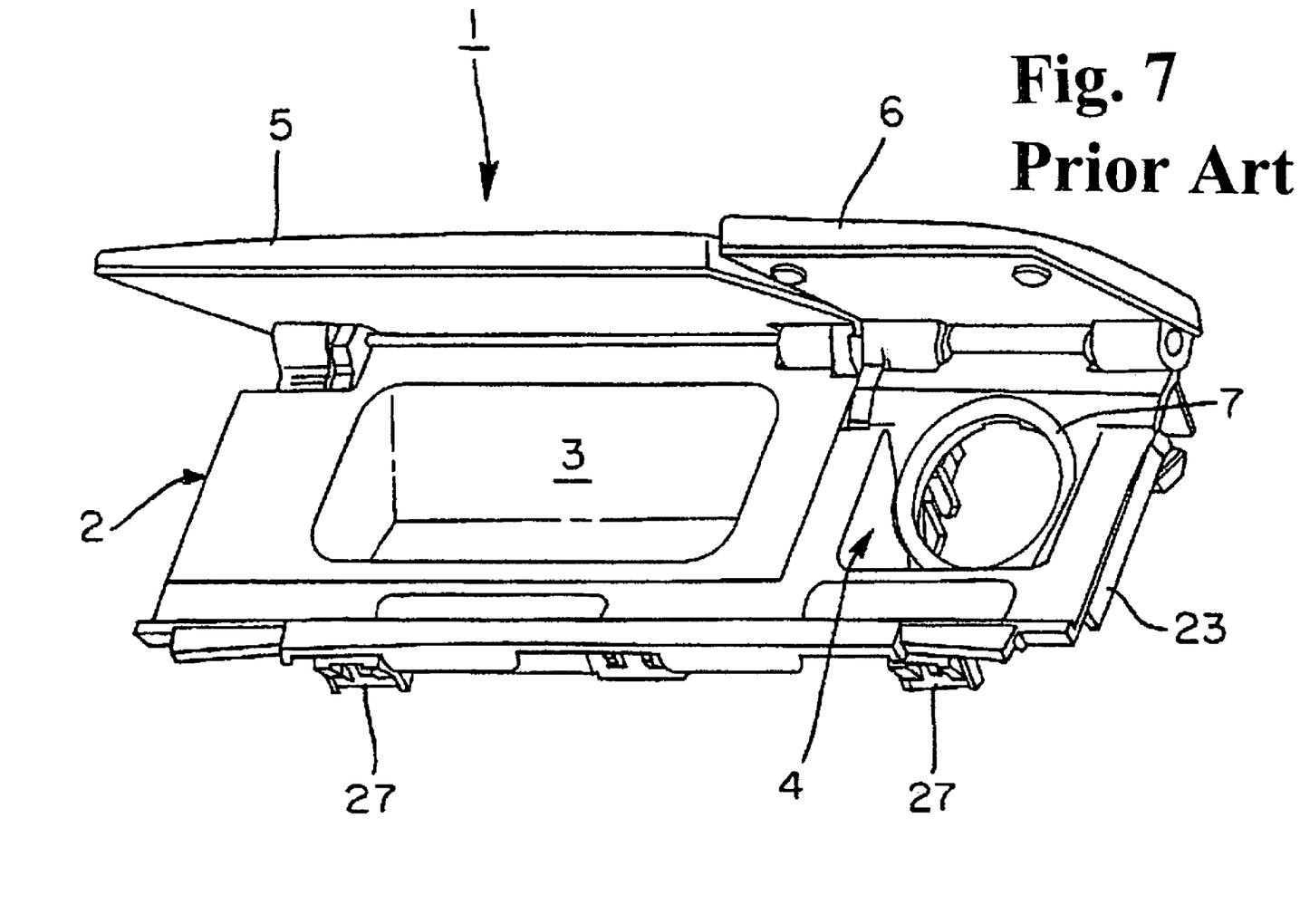
FIG. 7 is a schematic view showing a conventional storage device.

FIG. 7 is a view showing a storage device 1 disposed in a console of a vehicle. In the storage device 1, a main body 2 has recesses 3 and 4 for storage at right and left sides, and corresponding lids 5 and 6 open and close the recesses 3 and 4. The recess 3 has a storage space larger than that of the recess 4. The recess 4 has a receptacle 7 with an opening at a bottom side thereof, and a socket 8, as shown in FIG. 1(b), is installed at the receptacle 7. The socket 8 is utilized as a power source connector for various types of equipments, which is accessible to an occupant as needed when the lid 6 is opened. The lid 6 is closed in no use state to prevent dust or the like from entering and ensure safety.

In such a lid operating device used in the storage device 1, the lid is usually urged in the opening direction with urging means. The lid is rotationally switched from the open position to the closed position against the urging force of the urging means. At the closed position, latching means provided on either the main body or the lid engages and secures a striker provided on the other of the two to maintain the closed condition. By releasing the engagement, the lid is automatically switched from the closed position to the open position by the urging means.

As the latching means, a push-push mechanism utilizing a heart-shaped cam, as disclosed in Patent Reference 1, is employed for ease of use. An operation thereof is characterized by an engaging mechanism for engaging the striker with a push operation of the lid in a closing direction and releasing the engagement with another push operation in the same direction.

Patent Reference 1: Japanese Patent Publication (Kokai) No. 2001-151023.

In the storage device 1, the lid 6 is held in the locked condition with a push operation in the closing direction and rotationally switched to the open position by releasing the engagement with another push operation, thereby causing the following problems. With the structure described above, the recess 4 is fully open when the lid 6 is at the open position, so that dust, small objects, or the like enter and short the socket 8, or a small child may insert a hand or finger and short the socket 8. As a countermeasure, the lid 6 may be always urged toward the closed position with the urging force of the urging means. In this case, it is necessary to provide a finger hooking member on an upper surface or a front end of the lid to rotate the lid 6 in the opening direction against the urging force, thereby deteriorating appearance. When the lid 6 is always urged in the closing direction, a part of a cord connected to the socket 8 entering the recess 4 is pinched between the main body 2 and the lid 6, thereby causing wear.

An object of the present invention is to solve the above problems in a simple manner and eliminate dust or inadvertent insertion of a hand or finger into the main body, thereby improving safety and reliability of a device while maintaining appearance and ease of use.

Further objects and advantages of the invention will be apparent from the following description of the invention.

SUMMARY OF THE INVENTION

According to a first aspect of the present invention, a lid operating device for rotationally switching a lid position between a closed position covering a corresponding surface of a main body and an open position opening the corresponding surface of the main body includes a first urging device (means) for urging and moving the lid from the closed position to a mid position before reaching the open position; a second urging device (means) for urging and moving the lid from the open position to the mid position; a striker disposed on one of the lid or main body; and a latching device (means) disposed on the other for engaging the striker to hold the lid at the closed position with a push operation in a direction to close the lid and releasing the striker with another push operation in the same direction. The lid is automatically rotated from the closed position to the mid position by using the urging force of the first urging means, and manually rotated from the mid position to the open position against the urging force of the second urging means.

According to a second aspect of the present invention, a storage device includes the main body with an opening facing upwardly and the lid for opening and closing the opening. The lid is rotationally operated by the lid operating device, and a gap for hooking a finger is formed between a front end of the lid and the main body at the mid position.

In the invention, the lid is rotatably supported by the main body, and the position thereof is rotationally switched between the closed position, wherein the lid covers the corresponding surface of the main body (for example, an opening or operation panel) against the urging force of the first urging means, the mid position, wherein the lid is rotated by the urging force of the first urging means for a predetermined angle toward the open position, and the open position (usually refers to the fully open position), wherein the lid is rotated from the mid position against the urging force of the second urging means. When the lid is rotated by the urging force of the first urging means from the closed position to the mid position, the gap with a predetermined size is created between the end of the lid and the main body (usually a gap of about 5 to 15 mm). The gap is utilized as a hold when a user operates the lid from the mid position to the open position, and as a clearance for a cord connected to a socket within the main body. Further, the lid is rotated from the mid position to the open position against the urging force of the second urging means. When a pressure applied to the lid is released at the open position, the lid is automatically rotated back to the mid position by the urging force of the second urging means. Accordingly, it is possible to reduce dust or the like entering the socket within the main body, and prevent a user from inserting a hand, finger or the like and contacting the socket.

In the inventions described above, the latching means may be disposed on the main body, and the striker is disposed on an arm pivotally supported on the lid. The first urging means may be interposed between the main body and the arm for rotating the arm together with the lid from the mid position to the closed position. The lid is held at the mid position in a state wherein the arm abuts against a stopper disposed on the main body, and the position is switched from the mid position to the closed position as the lid rotates relative to the arm.

As described above, the present invention has the following advantages. The lid position is rotationally switched between the closed, mid, and open positions. The lid position is switched from the closed position to the mid position by the urging force of the first urging means, and switched from the mid position to the open position against the urging force of the second urging means. Accordingly, it is possible to prevent dust or inadvertent insertion of a hand or finger into the main body, thereby maintaining good appearance of the main body with a socket and improving safety. The striker is disposed on the lid via the arm, so that it is possible to reduce a part layout limitation while maintaining good appearance. The arm abuts against the stopper when the lid is in the mid position, so that the lid is held in the mid position stably and can be rotated in the opening direction against the urging force of the second urging means.

BRIEF DESCRIPTION OF THE DRAWINGS

FIGS. 1(a) and 1(b) are views showing a storage device according to an embodiment of the present invention, wherein

FIGS. 2(a) and 2(b) are views showing the storage device shown in FIGS. 1(a) and 1(b), wherein

DETAILED DESCRIPTION OF THE PREFERRED EMBODIMENTS

Figure 2A:
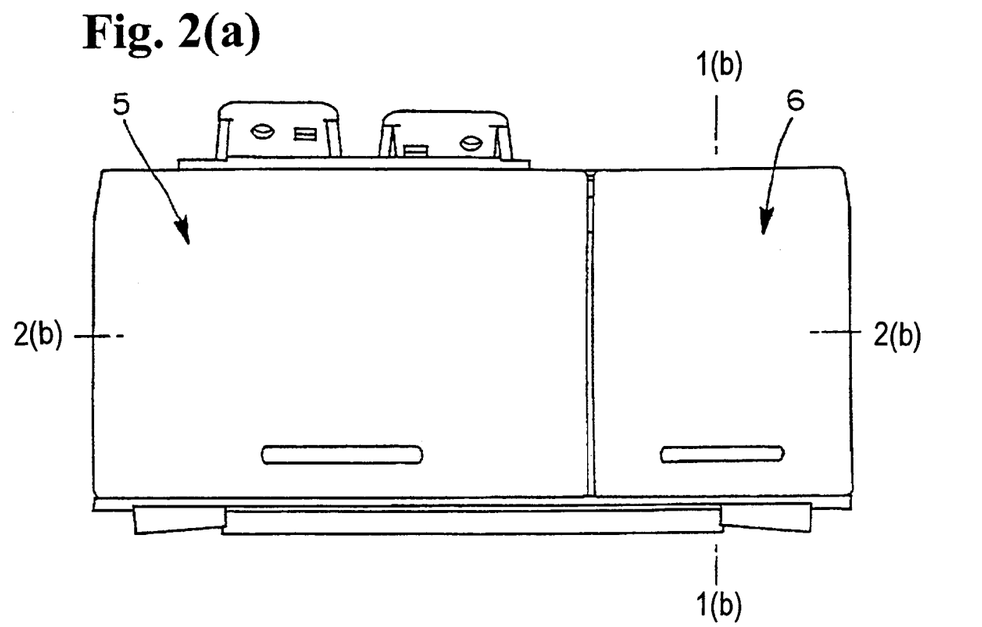
FIG. 2(a) is a side view thereof and FIG. 2(b) is a schematic sectional view thereof taken along line 2(b)-2(b) in FIG. 2(a)
Figure 2B:
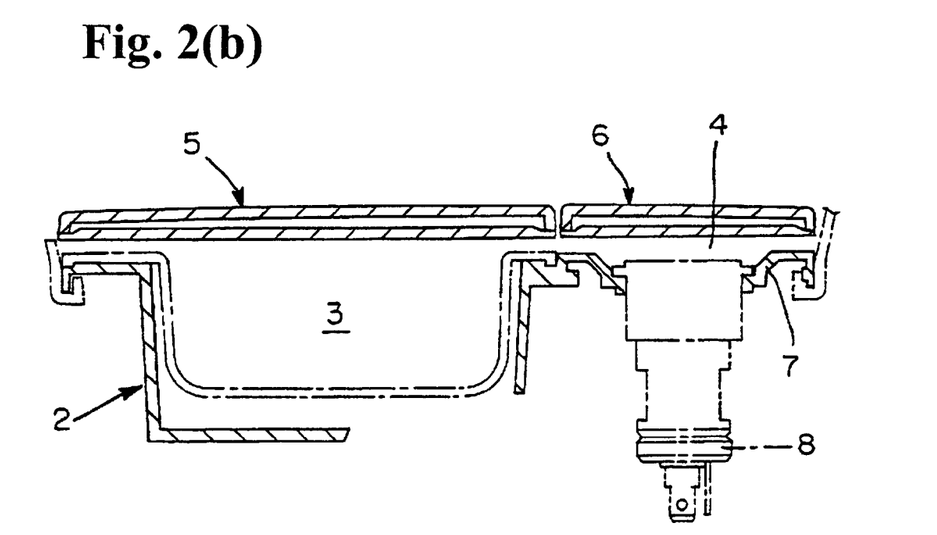
Figure 3:
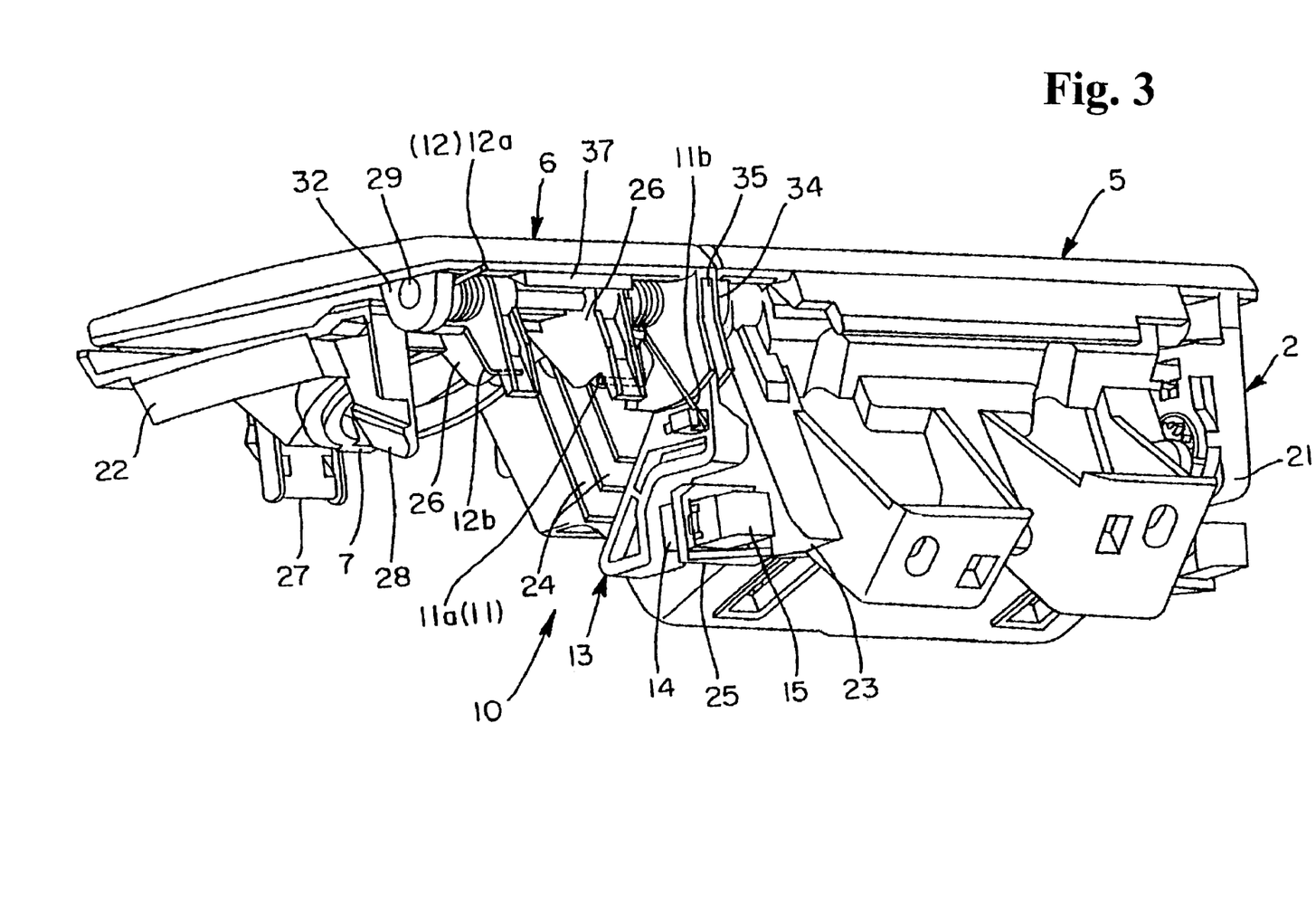
FIG. 3 is a rear view of the storage device shown in FIGS. 1(a) and 1(b)
Figure 4:
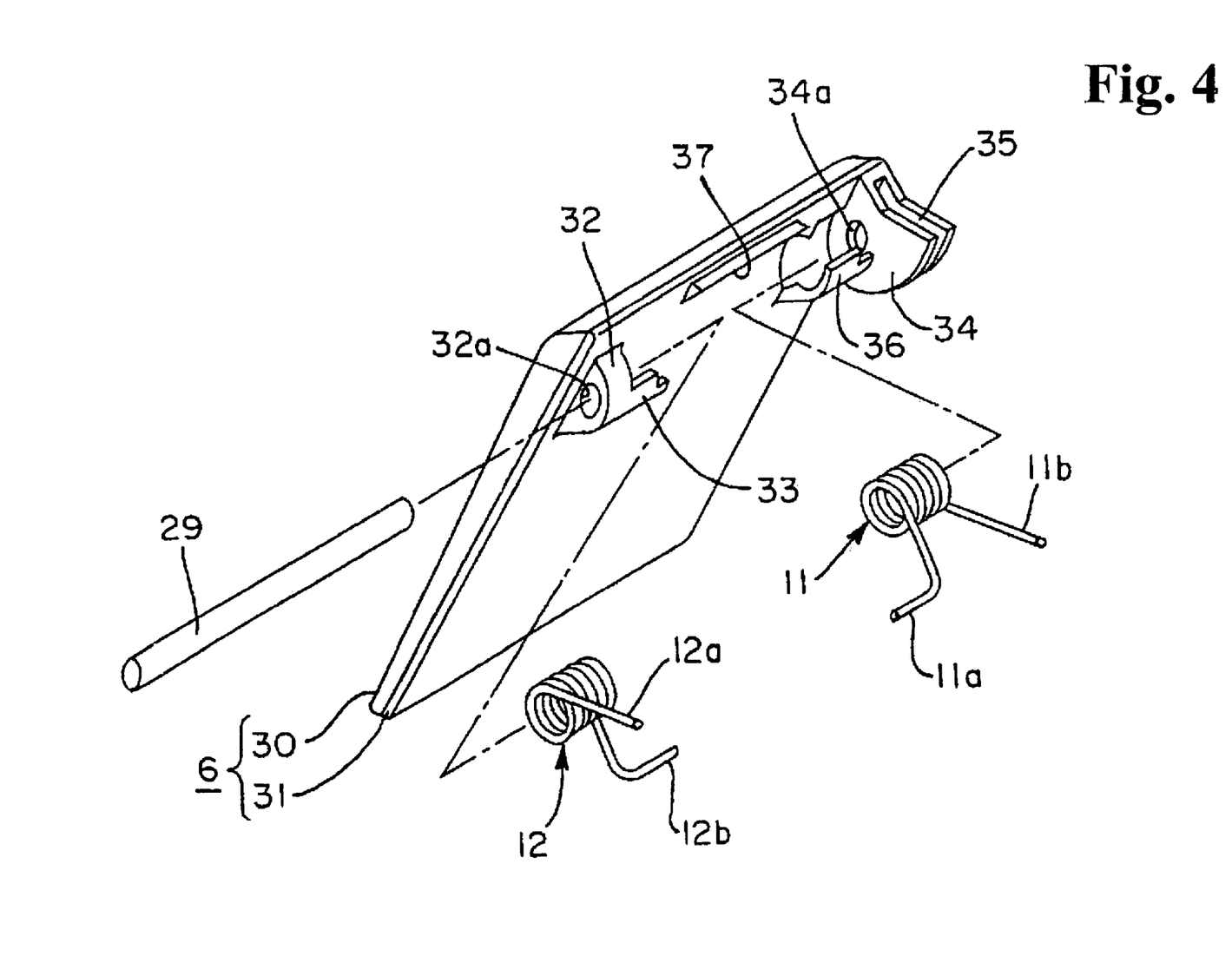
FIG. 4 is a view showing a relationship between a lid shown in FIGS. 1(a) and 1(b) and urging devices.

Hereunder, embodiments of the present invention will be explained with reference to the accompanying drawings. FIGS. 1(a) and 1(b) are views showing a storage device according to an embodiment of the present invention, wherein FIG. 1(a) is a side view and FIG. 1(b) is a schematic sectional view taken along line 1(b)-1(b) in FIG. 2(a). FIG. 2(a) and 2(b) are views showing the storage device shown in FIGS. 1(a) and 1(b), wherein FIG. 2(a) is a side view thereof and FIG. 2(b) is a schematic sectional view thereof taken along line 2(b)-2(b) in FIG. 2(a). FIG. 3 is a rear view of the storage device. FIG. 4 is a rear view of a lid together with urging devices. FIGS. 5(a), 5(b) and 6(a), 6(b) are views showing an operation of the lid operating device. Detailed explanations in the order of the storage device, the lid operating device, and the operation will follow.

(Storage Device)

A storage device 1 has essentially the same shape as the accessory storage 1 shown in FIG. 7, which is incorporated into the console of a vehicle. The main body 2 has recesses 3 and 4 for storage on the right and left sides, and the recesses 3 and 4 are opened or closed with lids 5 and 6, respectively. The recess 3 forms a larger storage space than that of the recess 4, and is opened or closed with the rotationally operated lid 5. The lid 5 is urged toward the opening direction by a conventional urging means or device not shown in the figures. A position of the lid 5 is switched from the open position to the closed position against the urging force of the urging means. The lid 5 is held at the closed position by engaging the striker disposed on the lid 5 with a latching means or device installed on the main body 2, and is switched from the closed position to the open position by the urging means when the latching engagement is released. The recess 4 forms a tubular receptacle 7 in the bottom surface. A socket 8 for a power source connection is installed at the receptacle 7 as shown in FIG. 1(b). The recess 4 is opened or closed by the lid 6 to which the lid operating device 10 of the present invention is applied. The socket 8 is utilized as a power source connector for various types of equipment accessible by operating the lid 6 as needed.

In the storage device 1, structures of the main body 2 and lid 6 which relate to the lid operating device 10 will be explained next. The main body 2, as shown in FIGS. 1(a)-1(b) to 3, integrally includes vertical walls 21 and 22 projecting downwardly at both sides; a middle vertical wall 23 projecting at the division between the sections defined by the recesses 3 and 4; plural stoppers 24 projecting from the middle vertical wall 23 to the receptacle 7; a substantially rectangular mounting frame 25 projecting from the lower side of the mid vertical wall 23 in the same direction as the stoppers 24; and a pair of support walls 26 projecting downwardly in the back. There is a gap, which corresponds to an arm 13 and latching means or device 15 (described later), between the stoppers 24 and the mounting frame 25. Each stopper 24 is a plate projecting at a predetermined angle, and its lower end face becomes a section abutting against the arm 13. The mounting frame 25 is provided with the latching means 15 described later. Each of the support walls 26 is provided with a coaxial shaft hole to support the shaft 29 described later so as to rotate freely, and a stopper formed in tiers to stop the ends 11b and 12b of the later described coil springs 11 and 12. Reference numerals 27 and 28 are mounting plates, which also are used for positioning the system relative to the console.

Figure 5A:
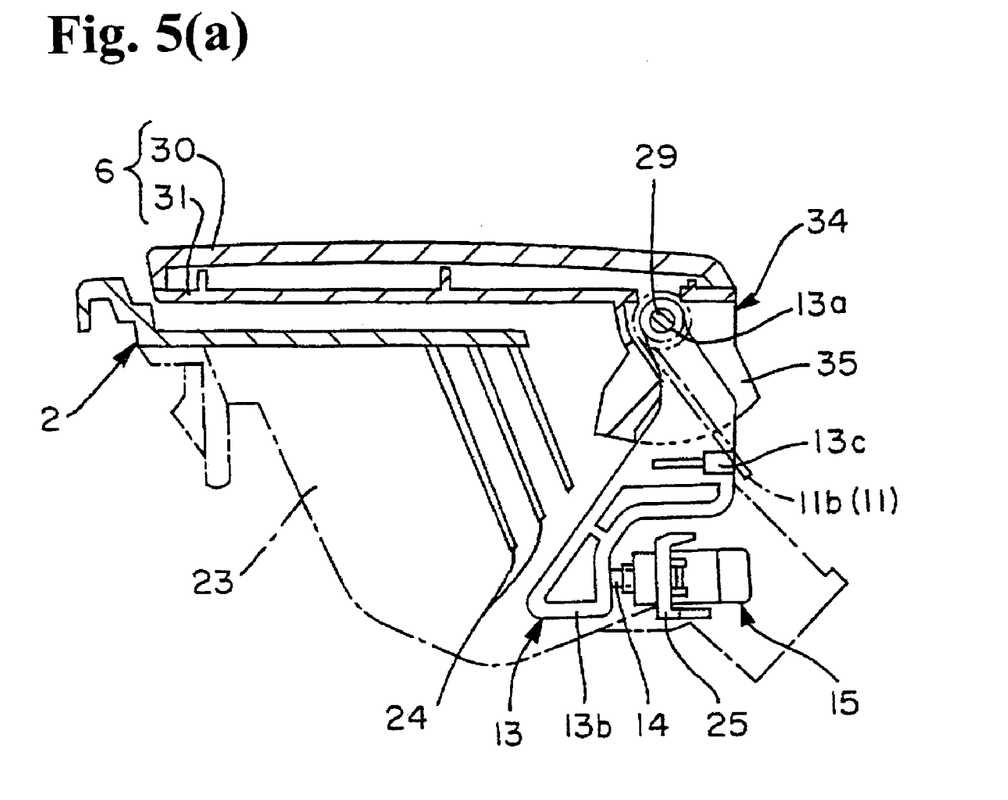
FIGS. 5(a) and 5(b) are views showing the storage device wherein the lid is in a closed position.
Figure 5B:
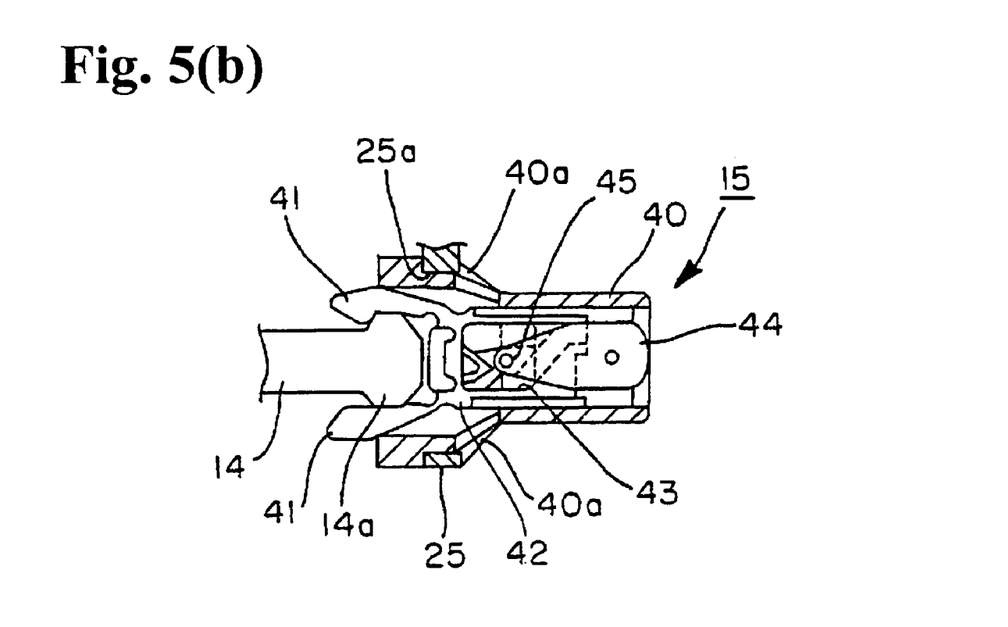

The lid 6, as shown in FIGS. 4 and 5(a)-5(b), is constructed such that an inner member 31 is attached to an outer member 30. The inner member 31 is provided with supports 32 and 34 projecting downwardly on both sides; spring receivers 33 and 36 projecting in correspondence to supports 32 and 34; and a flush section 37 projecting between the supports 32 and 34. The support 32 is a semicircular arc in shape and has a shaft hole 32a formed therein. The support 34 is also a semicircular arc in shape that is larger than the support 32, and has a fitting groove 35 and a shaft hole 34a coaxial with the shaft hole 32a. The fitting groove 35 is open at the rear and lower sides, and closed at the front side (see FIGS. 5(a)-5(b)). The spring receivers 33 and 36 are substantially tubular in shape and extend from the opposing sides of the supports 32 and 34, respectively, to hold the coiled sections of coil springs 11 and 12 in the spaces created with the inner member 31. The lower front side of the inner member 31 is provided with cushioning materials 38 in two locations, as shown in FIG. 1(a), and abuts against the section that faces the upper face of the main body 2 via the cushioning material 38.

The lid 6 described above is rotatably supported by the main body 2 to switch, while the shaft 29 is inserted through the shaft hole 32a of the support 32, the shaft holes of the above described support walls 26, the shaft hole 34a of the support 34, and the shaft hole provided on the middle vertical wall 23 toward the top. Each part of the lid operating device 10 is assembled in the corresponding location.

(Lid Operating Device)

The lid operating device 10 in the embodiment rotationally switches the position of the lid 6 between the closed position, wherein the lid covers and closes the recess 4 of the main body 2, and the open position, wherein the lid opens the recess 4. The components include a first coil spring 11; a second coil spring 12; an arm 13 pivotally supported by the support 34 of the lid 6; a striker 14 disposed on the arm 13; and a latching means 15 disposed on the main body 2 to engage with or disengage from the striker 14.

The first coil spring 11 urges and moves the lid 6 from the closed position to the mid position before reaching the open position, and the two ends 11a and 11b are formed to be relatively long. The second coil spring 12 urges and moves the lid 6 from the open position to the aforementioned mid position, and the two ends 12a and 12b are formed to be relatively long. The first coil spring 11 is so disposed that the coiled section rests on the spring receiver 36 and around the shaft 29, which extends to the shaft hole 34a; one end 11a is secured by the stopper provided on the opposing support wall 26, while the other end 11b is caught by the stopper 13c of the later described arm 13 while exerting spring pressure (see FIG. 5(a)). The second coil spring 12 is so disposed that the coil section rests on the spring receiver 33 and around the shaft 29 that is fed through the shaft hole 32a; one end 12a is secured at the bottom surface of the lid 6, while the other end 12b is caught by the stopper provided on the opposing support wall 26 while exerting spring pressure.

The arm 13, as shown in FIGS. 3 and 5(a)-5(b), which is a narrow plate extending up and down, integrally forms a shaft hole 13a at the top; a striker 14 that projects on the side slightly above the bottom end 13b; and a stopper 13c that projects in a mid location of the front face. As for the thickness, the section above the stopper 13c is formed thinly enough so as to fit in the fitting groove 35 of the support 34 with a margin, and the rest of the plate is formed relatively thicker. The striker 14 is provided with an engaging projection 14a at the tip. When the lid 6 is attached to the main body 2 via the shaft 29, the upper side of the arm 13 is inserted into the fitting groove 35, and upon aligning the shaft hole 13a with the shaft hole 34a of the support 34, the shaft 29 is fed through the inner shaft hole 34a of the support 34, the shaft hole 13a, and the outer shaft hole 34a of the support 34. Then, the first coil spring 11, as described earlier, is secured by the opposing support wall 26 on one end 11a, and caught by the stopper 13c of the arm 13 on the other end 11b while exerting spring pressure. The urging force of the first coil spring 11 rotates the arm 13 forward. The upper section is maximally fitted into the fitting groove 35, and the lower front side abuts against the stopper 24 to regulate the rotation.

The latching means 15, as shown in FIGS. 5(a)-5(b) and 6(a)-6(b), is a push-push engaging mechanism. It is inserted into and held by the mounting frame 25 of the main body 2 to hold the lid 6 at the closed position by engaging with the striker 14 with a push operation applied to the lid 6 in the closing direction and releases the engagement with another push operation applied to the lid 6 in the same direction. The structure includes, for example, a case 40 that is open in the front and back faces; a sliding part 42 that is held within the case 40 and has a pair of engaging parts 41 to engage with or release the engaging projection 14a of the striker 14; a spring (not shown) that urges the sliding part 42 in one direction; a heart-shaped cam groove 43; a tracer 44 rotatably supported within the case 40; and a pin 45 that projects from the tracer 44 to engage with and move around the heart-shaped cam groove 43 with the sliding motion of the sliding part 42. When the case 40 is inserted into the mounting frame 25, the latching means 15 is fitted via the elastic engaging sections 40a provided on both sides so as not to become loose. The latching means 15 is not limited to the structure. The push-push mechanism disclosed in Patent Reference 1, for example, may as well be used.

(Operation)

The lid operating device 10 described above switches the position of the lid 6 relative to the main body 2 among the closed, mid, and open positions through the following operation.

Figure 6A:
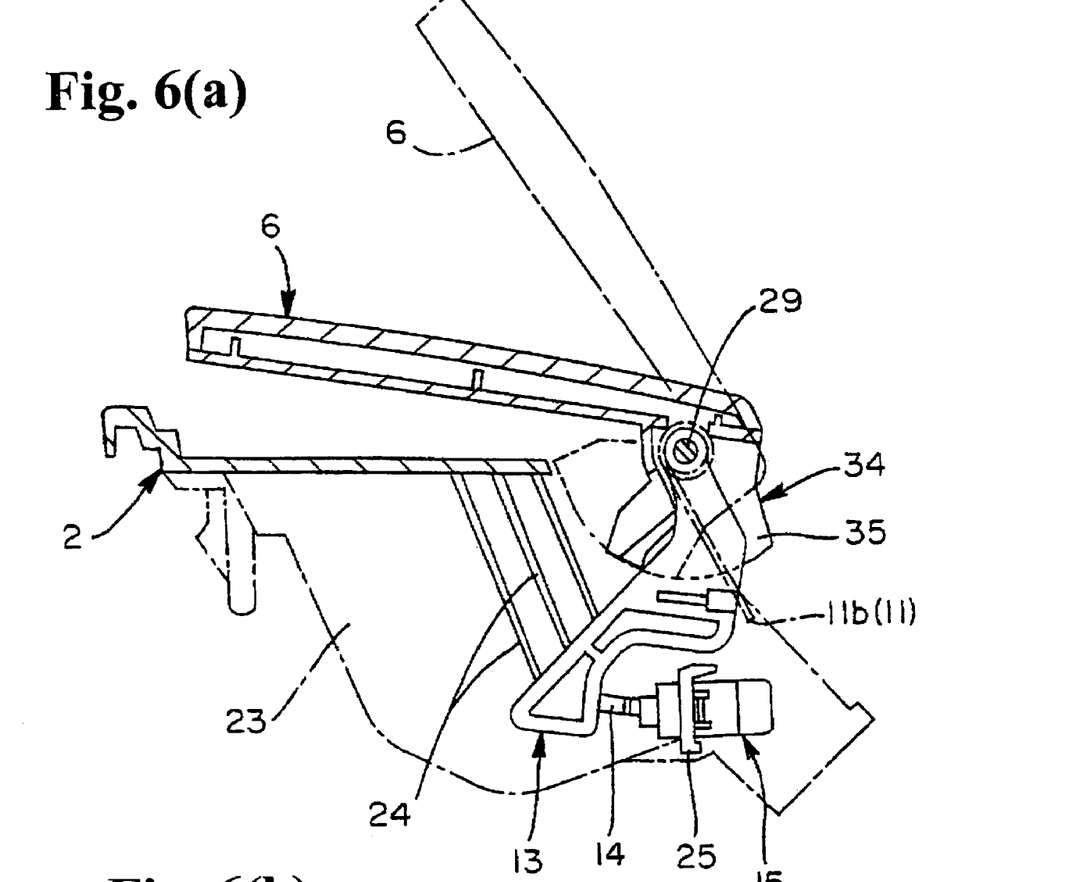
FIGS. 6(a) and 6(b) are views showing the storage device wherein the lid is in a mid position.
Figure 6B:
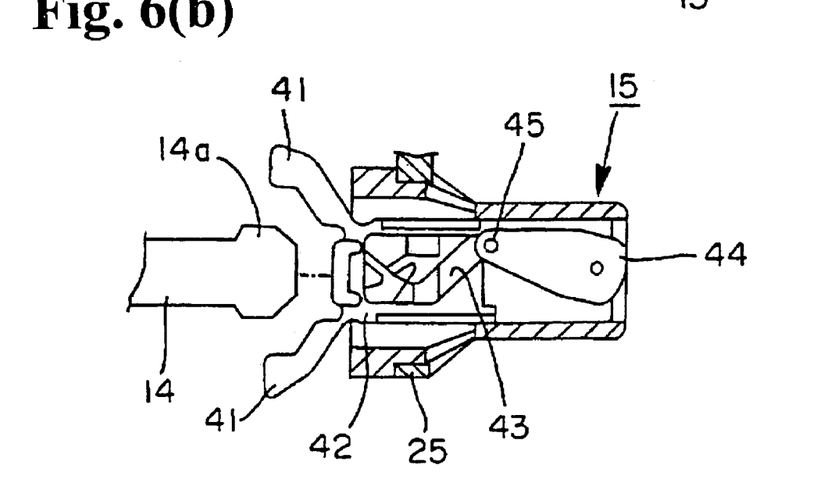

(A) The solid lines in FIGS. 1(a)-1(b) and FIGS. 5(a) and 5(b) illustrate the lid 6 in the closed position wherein the striker 14 engages the latching means 15 following the push operation to rotate the lid 6 from the mid position, indicated by the solid lines in FIG. 6(a), in the closing direction. In this case, when the lid 6 is pushed and rotated in the closing direction, the engaging projection 14a bumps against the sliding part 42 and slides the sliding part 42 to the back of the case 40 against the urging force of the spring not shown in the figures. Along with this motion, both of the engaging parts 41 pinch the engaging projection 14a therebetween as they are pulled into the case 40. At the same time, the engaging parts 41 are secured in the retracted position as the pin 45 engages the heart-shaped cam groove 43. As a result, the lid 6 is held in the closed position against the urging force of the first coil spring 11.

(B) To switch the lid 6 into the open position, the lid 6 is first rotationally switched to the mid position. In this case, the lid 6 is pushed further in the closing direction to release the force applied to the lid 6. Then, the push operation applied to the lid in the closing direction disengages the pin 45 from the heart-shaped cam groove 43, and, at the same time, the urging force of the spring (not shown) pushes the sliding part 42. As a result, the latching means 15 extensively pushes out both of the engaging parts 41 to the front of the case 40. Consequently, the engaging projection 14a is freed from the pinching action of the engaging parts 41, thereby releasing the latching. The lid 6, therefore, is rotated by the urging force of the first coil spring 11 from the closed position in the opening direction, and is automatically switched to the condition wherein the arm 13 abuts against the stopper 24, namely, the mid position. In the mid position, a gap with a predetermined size is created between the front end of the lid 6 and the upper face of the main body 2. The gap is set to be about 5 to 15 mm suited for hooking a finger.

(C) To switch the lid 6 from the mid position to the open position, a finger or the like is inserted into the gap described above indicated with the solid lines in FIG. 6(a), and the lid 6 is pushed in the opening direction indicated with the phantom lines in FIG. 6(a) against the urging force of the second coil spring 12 to rotationally operate the lid 6. In this embodiment, when the lid 6 is rotated in the opening direction and reaches the stage at which the flush section 37 abuts against the corresponding sections of the support walls 26, the lid 6 is located at the fully open position. In other words, the support walls 26 also function as stoppers for the lid 6 in the opening direction. The user can then connect various types of equipment to the socket 8 in the recess 4. Once the pushing force in the opening direction is removed, the lid 6 is rotated to the mid position by the urging force of the second coil spring 12. While the socket 8 is in use, the lid 6 is held in the mid position, and thus the cord of various types of equipment, for example, can be arranged inside and outside of the recess 4 through the aforementioned gap created between the front end of the lid 6 and the top face of the main body 2.

As described above, according to the present invention, the lid operating device and the storage device using the lid operating device solve the problems cited in connection with the conventional device, thereby preventing dust or the like from entering the main body and inadvertently insertion of a hand or finger of a child into the main body. The present invention is not limited to the embodiments described above, and various modifications are possible for each means used therein. For example, the coil springs 11 and 12 may be replaced with plate or torsion springs, and the striker 14 may be disposed on the main body 2 while disposing the latching means 15 on the lid 6.

The disclosure of Japanese Patent Application No. 2004-063321, filed on Mar. 8, 2004, is incorporated in the application.

While the invention has been explained with reference to the specific embodiments of the invention, the explanation is illustrative and the invention is limited only by the appended claims.

What is claimed is:

1. A lid operating device for rotationally switching a lid between a closed position and an open position relative to a main body, comprising:
   a first urging device installed between the lid and the main body for urging the lid from the closed position to a mid position between the closed position and the open position so that the lid automatically rotates from the closed position to the mid position,
   a second urging device installed between the lid and the main body for urging the lid from the open position to the mid position so that the lid manually rotates from the mid position to the open position against a force of the second urging device,
   a striker disposed on one of the lid and the main body, and
   a latching device disposed on the other of the lid and the main body for engaging the striker to hold the lid at the closed position when the lid is pushed in a closing direction, said latching device releasing the striker when the lid is pushed in the closing direction one more time,
   wherein said latching device is disposed on the main body, and said striker is disposed on an arm pivotally supported on the lid.

2. A lid operating device according to claim 1, wherein said first urging device is disposed between the main body and the arm so that the arm rotates together with the lid from the mid position to the closed position.

3. A lid operating device according to claim 1, further comprising a stopper disposed on the main body for abutting against the arm to be held at the mid position so that the lid is switched from the mid position to the open position while rotating relative to the arm.

4. A lid operating device according to claim 1, wherein said arm engages the lid from the mid position to the closed position, and disengages from the lid from the mid position to the open position.

5. A storage device comprising the lid operating device according to claim 1, the main body with an opening, and the lid for opening and closing the opening, wherein a gap is formed between the lid and the main body when the lid is situated at the mid position.

* * * * *